April 2, 1968      A. A. ONDREJKA      3,376,034
GUY WIRE SHOCK ABSORBER
Filed Dec. 13, 1965

INVENTOR.
ALBERT A. ONDREJKA
BY Harry A. Herbert Jr.
ATTORNEY

Henry S. Miller Jr.
AGENT

# United States Patent Office 3,376,034
Patented Apr. 2, 1968

3,376,034
GUY WIRE SHOCK ABSORBER
Albert A. Ondrejka, 3200 Glenvalley Drive,
Midwest City, Okla. 73110
Filed Dec. 13, 1965, Ser. No. 513,915
4 Claims. (Cl. 267—71)

ABSTRACT OF THE DISCLOSURE

A guy wire shock absorber including a pair of opposed interlocking bifurcated teardrop-shaped members having a shock absorbing material located between the members and grooves to restrict the movement of the guy wires.

---

The invention described herein may be manufactured and used by or for the United States Government for governmental purposes without payment to me of any royalty thereon.

This invention relates generally to guy wire shock absorbers, and more specifically to a device which will not only absorb shock but will also provide a means for maintaining the proper tension on the guy wires.

In the usual course of antenna and tower design a great deal of emphasis is placed on the ability of such structures to withstand damage from severe wind, earth tremors and nuclear overpressures. To prevent the cost from being unduly burdensome, extensive use is made of guy wires for support and stabilization. Guy wires also give flexibility to a structure and permit them to be moved with relative ease, and further by pivoting a tower on a small base guy wires increase the number of locations where tall structures may be located.

With the use of guy wires, certain continuing problems have arisen and although attempts have been made to solve them, none have proved completely satisfactory. For example, where the towers carry electrical current, the guy wires must be insulated from ground. One method of doing this is to use glass or ceramic insulators; however, under a sharp impact the insulator is readily broken which, in turn, makes the guy wire slack and the tower without support. Another problem is the galloping wire phenomena which occurs when ice is formed on guy cables; at the slightest pressure, the ice-ladened cable will snap unless this condition is dampened sufficiently. Likewise, wind effects, known as the "Karmen Vortices" will snap guy wires unless properly damepned.

It is therefore an object of this invention to provide a new means for dampening the motion of guy wires.

It is a further object of this invention ot provide a shock absorbed for tensioned wires.

It is still another object of this invention to provide a shock absorber that is light, rugged and relatively inexpensive.

It is still a further object of this invention to provide a guy wire shock absorber that will absorb shocks from severe wind, earth tremors and nuclear overpressures.

It is another object of this invention to provide a shock absorber which will maintain a constant tension on a guy wire.

These and other advantages, features and objects of the invention will become more apparent from the following description taken in connection with the illustrative embodiments in the accompanying drawings, wherein.

Figure 1:
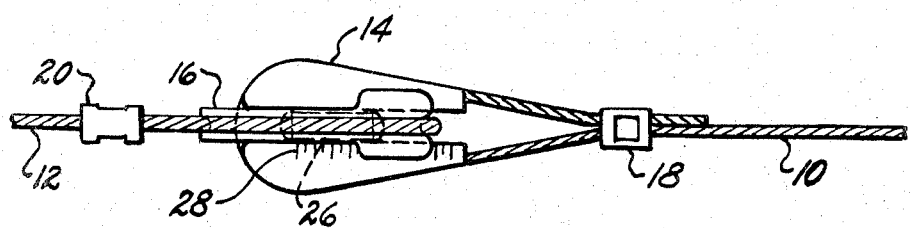
FIG. 1 is an elevation view of this invention.

Referring now to FIG. 1, the shock absorber is seen in the assembled condition. The guy wires 10 and 12 consisting of a wire rope or cable are looped over the convex end of the crescent or bifurcated teardrop shaped bodies 14 and 16, respectively, where they are brought back on themselves and secured by the clamps 18 and 20. The bodies, which are identical, are mounted with the open ends interlocked after rotating one body 90° to the other. The shock absorbing 26 material is mounted within the confines of the two bodies and restricted principally by the two legs of each body. The bifurcated teardrop shaped bodies may be made of various materials, depending in their utilization. Where the shock absorber is to be used on a tower or mast, which is itself to be a radiator or electrical conductor, the bodies may be made of glass, ceramic or plastic. The markings 28 are provided as a tensioning indicator and may be calibrated according to the shock absorbing material selected.

Figure 2:
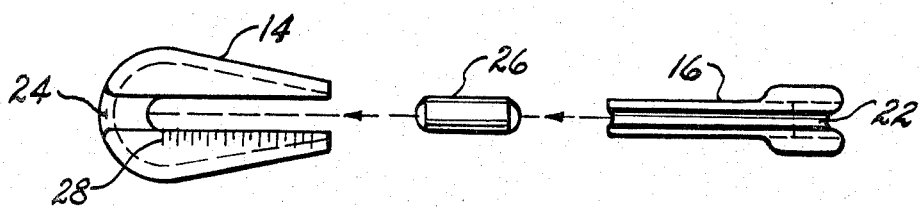
FIG. 2 is an exploded view of the invention.

FIG. 2 illustrates the invention in an exploded view without the guy wires. The body 16 which is identical to the body 14 contains a circular channel 22 formed out of the outer perimeter of the teardrop-shaped body. This channel is to support the guy wire and prevent any shifting of position by the wire. The body 14 shows an area of reduced thickness 24 at the approximate center of the crescent-shaped region. The reduced area is as wide as the body is thick, and as deep as the legs of the body are separated. The open ends of each body, therefore, will slip into and through the area of reduced thickness of the other body and thereby a small enclosure is formed by the four legs. With this arrangement axial motion is permitted but side play is prevented by the walls on either side of the reduced area. Located within this enclosed area is an elastic shock isolator 26. The isolator may be made of an elastomer, deformable plastic or a metal spring. While the shock isolator shown is generally a cylindrically shaped member, a number of other shapes could be utilized such as a solid or perforated cube, a necked or spherical shape, as well as a compression spring or series of Belleville cups.

In use the shock absorber would be mounted between the tower or mast and a securing means. Each guy wire is not limited to one shock absorber, as the determining factor is the type of structure to be supported, not the absorber. After the guy wires are in place with the shock absorbers mounted, the wires are loaded to a predetermined tension, thus compressing the shock absorbing insert a calculated amount which depends upon the spring contact of the insert.

With the arrangement thus described, if an occasion arises when a load or force resulting from wind, nuclear overpressure or earth tremor is suddenly applied to the structure, the shock will be absorbed by compression and expansion of the shock isolating insert, thus reducing the overall shock effect on the guys and structure to a tolerable level, preventing damage and injury.

While the invention has been described with reference to particular embodiments, it will be understood to those skilled in the art that the invention is capable of a variety of alternative embodiments within the spirit and scope of the appended claims.

I claim:

1. A guy wire shock absorber comprising: a first and second bifurcated teardrop-shaped means, said second means at right angles to the first means and the extended ends of each means interlocked with the other; a shock absorbing material located within the confines of the extended ends of the means and therebetween; wire ropes surrounding the first and second shaped means for applying pressure such that the bifurcated teardrop-shaped means are pulled together against the shock absorbing material; tension marks located on the extended ends of the teardrop-shaped means whereby the tension can be measured as the shock absorbing material is compressed.

2. A guy wire shock absorber according to claim 1 wherein: the teardrop-shaped means are ceramic.

3. A guy wire shock absorber according to claim 1 wherein: the teardrop-shaped means are glass.

4. A guy wire shock absorber according to claim 1 wherein: the teardrop-shaped means is metal.

References Cited

UNITED STATES PATENTS

| 200,803 | 2/1878 | Riley | 267—71 |
|---|---|---|---|
| 503,408 | 8/1893 | Davis | 267—70 |
| 315,223 | 4/1885 | Belding | 267—71 |
| 384,008 | 6/1888 | Wheeler | 267—71 |
| 450,626 | 4/1891 | Kerstein | 267—70 |
| 2,801,843 | 8/1957 | MacCluney | 267—70 |

FOREIGN PATENTS 570,060   1/1924   France.

ARTHUR L. LA POINT, *Primary Examiner.*

R. M. WOHLFARTH, *Assistant Examiner,*